United States Patent [19]

Listebarger, Jr.

[11] Patent Number: 4,961,281

[45] Date of Patent: Oct. 9, 1990

[54] FISHING LEADER HOLDER

[76] Inventor: Earl R. Listebarger, Jr., 6955 Holeman #11, Blaine, Wash. 98230

[21] Appl. No.: 438,787

[22] Filed: Nov. 20, 1989

[51] Int. Cl.⁵ ............................................. A01K 97/00
[52] U.S. Cl. ...................................................... 43/57.2
[58] Field of Search ......................................... 43/57.2

[56] References Cited

U.S. PATENT DOCUMENTS

| | | | |
|---|---|---|---|
| 2,225,309 | 12/1940 | Larence | 43/57.2 |
| 2,670,563 | 3/1954 | Anderson | 43/57.2 |
| 2,804,717 | 9/1957 | Ripperdan | 43/57.2 |
| 4,447,015 | 5/1984 | Peterson | 242/55.2 |
| 4,513,526 | 4/1985 | Grace et al. | 43/57.2 |

Primary Examiner—Richard K. Seidel
Assistant Examiner—James Miner
Attorney, Agent, or Firm—Donald J. Breh

[57] ABSTRACT

A fishing leader holder is disclosed including an elongated tubular member having a graduated scale, a fixed annular flange at one end including a plurality of longitudinal peripherial grooves and at least one additional flange slidably mounted to the tubular member having a plurality of longitudinal hook receiving holes aligned with respective ones of the longitudinal peripherial grooves in the first fixed flange. An alternative embodiment includes a third annular flange slidably mounted to the tubular member between the first fixed flange and the second slidable flange and also having a plurality of longitudinal holes for receiving fish hooks each aligned with respective one of the peripherial grooves in the fixed flange. Fishing leaders are retained between the fixed flange and either of the slidable flanges by engaging the hook end of the leader into one of the longitudinal holes and pulling the swivel end of the leader tightly against an outer surface of the fixed flange with the leader passing through a groove in the fixed flange by sliding the slidable flange to tension the leader.

18 Claims, 2 Drawing Sheets

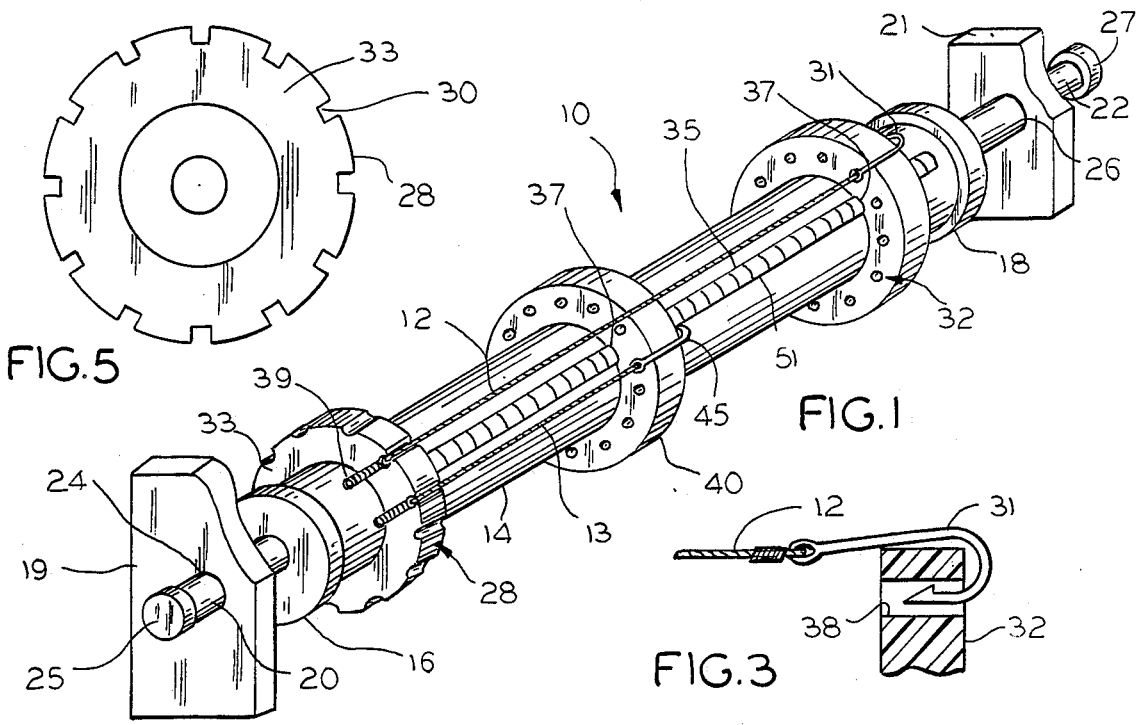
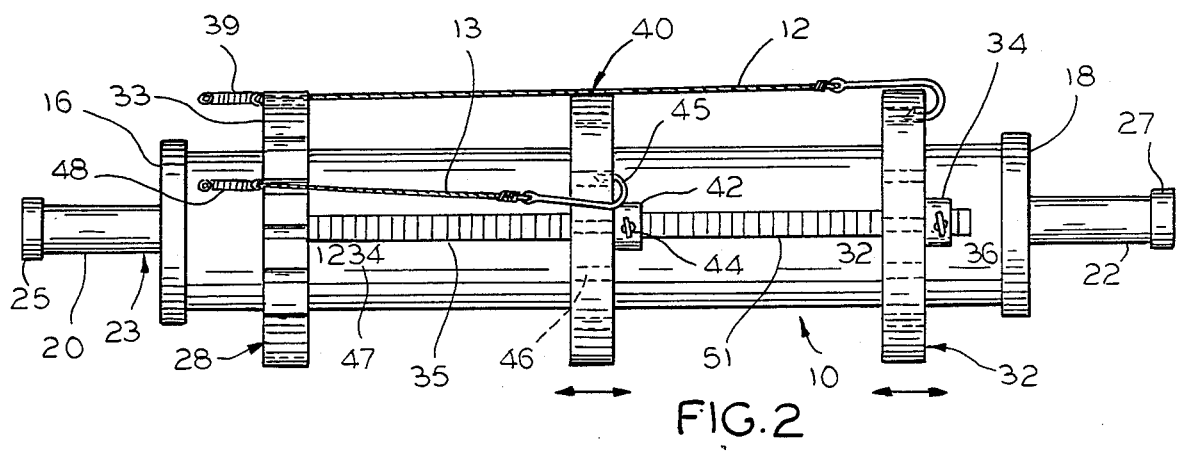
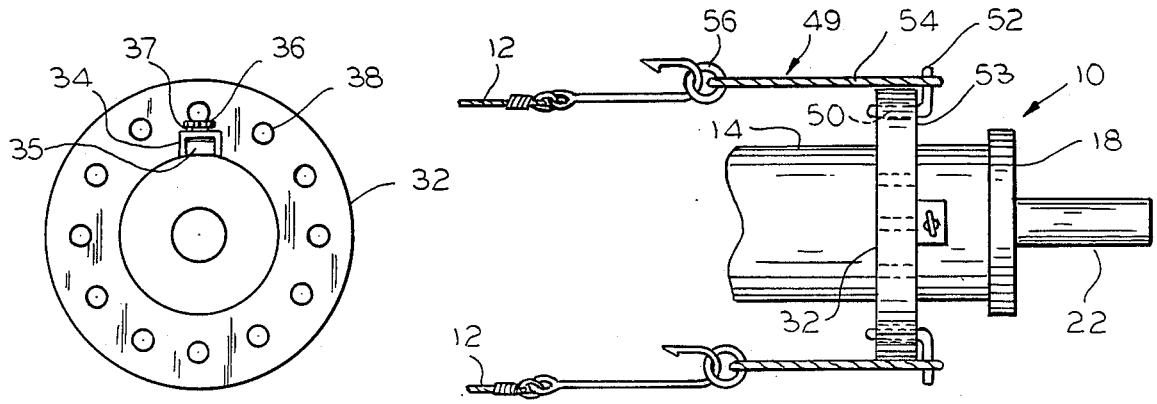

FISHING LEADER HOLDER

BACKGROUND OF THE INVENTION

This invention relates to fishing equipment. More particularly, the invention relates to a holder for holding fishing leaders and lures.

Leader holders, or caddies as they are sometimes referred too, exist including those described in U.S. Pat. Nos. 2,604,721, 2,667,010, 3,213,564, 3,713,244 and 4,179,834. In general, known leader holders such as these comprise elongated bodies provided with protruding hooks, tabs or flanges to which opposing hook and swivel ends of the leader are attachable. Some holders provide for attaching leaders of different lengths which is advantageous but such holders typically require cumbersome adjustment of retaining members or have soft, hook puncturable members or bodies which over time with repeated use deteriorate and can become destroyed or ineffective. For example, to change the leader length holding capability of the device in U.S. Pat. No. 4,667,010, a threaded nut on a central threaded shaft must be loosened and a threaded disk rotated on the shaft to a new desired position and the nut retightened against the disk. Not only is an auxiliary wrench required to be available to loosen the nut, but the disk must be precisely prepositioned before attaching the leader since, once the leader is attached, the disk cannot be rotated and re-positioned. Should the leaders to be held be of slightly different length, or if the disk is not precisely positioned the leaders will either be over tensioned or be loose when attached, in which case, the lines will either not be securely held or the device must be disassembled and the disk re-positioned. Further, although that holder does provide for adjustment to accept different leader lengths, only one leader length may be attached at any given time. That is, leaders of different lengths cannot be intermixed on the same holder.

The holder disclosed in U.S. Pat. No. 3,213,564 simultaneously holds leaders of different lengths but utilizes a penetrable member into which the hook end of the leader penetrates which can deteriorate over time due to repeated use.

SUMMARY OF THE INVENTION

The present invention provides for a leader holder that accepts a plurality of leaders of different lengths without the requirement for any penetrable body or member and which does not require great manipulation to use.

According to the invention, there is an elongated body having a fixed annular flange at one end provided with longitudinal grooves in its peripherial surface and a second annular flange mounted for slidable movement over the length of the tube for positioning at different spacings from the first fixed flange.

According to an important feature of the invention, a set screw frictionally, releasably retains the slidable second flange at desired spacings.

According to an important feature of the invention, the second slidable flange includes a plurality of longitudinal holes aligned with the longitudinal peripherial grooves in the first flange.

Another important feature of the invention provides for a pair of extension members extending co-axially from opposite ends of the tubular member for receipt in an external mounting member in, for example, a compartment of a boat.

According to another embodiment, there is provided a third annular flange slidably mounted to the elongated body between the first flange and second slidable flange.

According to the invention, the third slidable flange includes a set screw for frictionally, releasably retaining the third flange to the body also at a plurality of different spacings from the fixed flange.

According to another important feature of the invention, the third annular flange is provided with plurality of longitudinal holes aligned with the longitudinal peripherial grooves in the fixed flange.

A still further important feature provides for at least one resilient adapter receivable in the longitudinal holes in the second annular slidable flange which adapter includes means for receiving the hook end of the leader and means to tension the leader and accept leaders of different lengths.

Yet another feature of the invention provides for an axially resilient member at one end of the body of the holder providing for biasing the holder between opposing supporting surfaces of, for example, a tackle box.

BRIEF DESCRIPTION OF THE DRAWING

The invention will be better understood after reading the following Detailed Description of the Preferred Embodiment in conjunction with the drawing in which:

FIG. 1 is a pictorial view of a leader holder according to the invention;

FIG. 2 is a side elevational view of the leader holder of FIG. 1 showing details of construction;

FIG. 3 is an enlarged partial cross section showing details of one hook receiving hole;

FIG. 4 is an end view of the holder in FIG. 2 taken toward the slideable annular flange showing details of construction;

FIG. 5 is an end view of the holder of FIG. 2 taken toward the fixed annular flange showing details of construction;

FIG. 6 is an enlarged partial side elevational view of the holder showing details of construction of an alternative embodiment;

DETAILED DESCRIPTION OF THE PREFERRED EMBODIMENT

Figure 7:
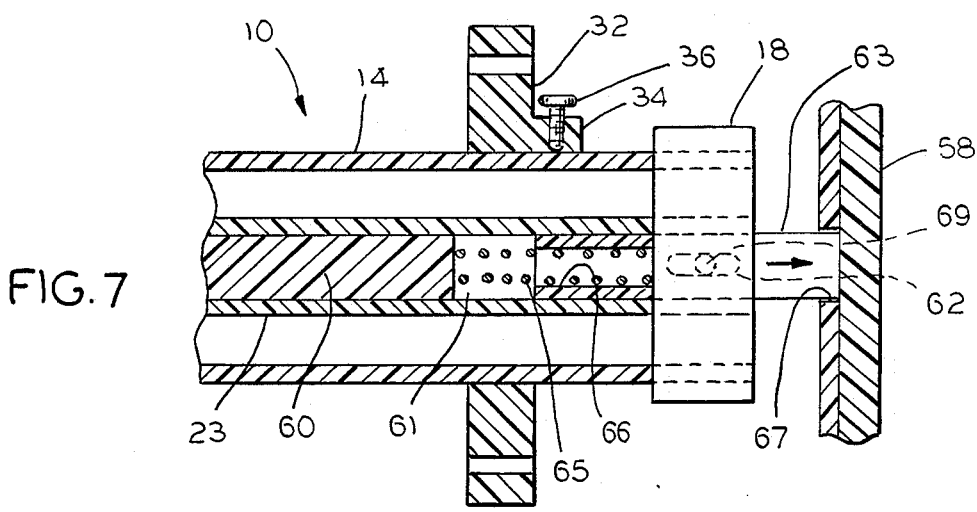
FIG. 7 is an enlarged partial cross sectional view of the holder showing details of an alternative embodiment.

Shown in FIG. 1, is a holder 10 for holding fishing leaders 12, 13 of different lengths. The holder 10 includes an elongated tubular body 14 of any length desired but preferably of a length sufficient to accommodate leaders of commonly used lengths of for example up to about 36 or 48 inches. The tubular member is closed on opposing ends 16, 18 and is provided with a pair of co-axial extensions 20, 22 formed by an internal smaller diameter tube 23 which extends co-axially through the tubular body 14. The extensions 20, 22 provide for mounting the holder in external mounting brackets 19, 21, in for example, a storage compartment of a boat by inserting the extensions 20, 22 into apertures 24, 26 provided in the brackets 19, 21. Removable retaining caps 25, 27 axially retain the extensions in the brackets 19, 21. The brackets are spaced sufficiently apart to provide enough axial clearance between the end caps 16, 18 and the brackets 19, 21 so that the extensions may be alternately inserted into and removed from the apertures 24, 26 with the retaining caps 25, 27 removed. The full bearing support provided by the apertures positively retains the holder under all boat movements.

Provided at one end of the body 14, for example end 16 in the drawings, is a first fixed annular flanged 28. First fixed flange 28 is provided with a plurality of spaced apart longitudinal grooves 30 in its peripherial surface sized to receive a desired leader line diameter. The grooves may be for example on the order of about 1/32 ' wide by ¼' deep. A second annular flange 32 is slidably mounted on the tubular body member 14 proximate the opposite end, end 18 in the drawing, and includes a tab or boss 34 having a finger operated set screw, such as the thumb-screw 36 shown best in FIGS. 4 and 7, to frictionally, releasably retain the slidable flange at a plurality of locations spaced from the fixed flange 28 in accordance with a desired leader length. Preferably the tubular body 14 is provided with a raised key 35 extending along the majority of its length. The key 35 is received in a complimentary key slot 37 provided in the slidable flange 32 to prevent rotation of the flange on the tube 14. As noted below, if desired, the surface of the raised key 37 can be imprinted with a scale 51.

The slidable flange 32 is provided with a plurality of fish hook receiving longitudinal holes 38 on the order of about ⅛' in diameter each aligned with a respective one of the grooves 30 in the fixed flange 28. In use, the hook 31 of the leader is engaged in one of the longitudinal holes 38 and the swivel end 39 of the leader is pulled against the outward facing surface 33 of the fixed flange 28 with the leader passing through the groove 30 that is aligned with the hole in which the hook is engaed by sliding the slidable flange 32 away from the fixed flange to pull the leader taunt and then tightening the set screw.

An alternative embodiment provides for a third annular flange 40 to be slidably mounted on the body 14 between the first fixed flange 28 and the second slidable flange 32. The third slidable flange 40 is also provided with a tab or boss 42 and a finger operated set screw 44 to frictionally, releasably hold the flange at a plurality of different locations spaced from the fixed flange. Like the flange 32, the flange 40 is also provided with a key slot 37 for receiving the raised key 35 to prevent rotation. The intermediate, third slidable flange also includes a plurality of longitudinal holes 46 each aligned with respective grooves 30 in the fixed flange 28. It can be seen that the leaders 13 which have a length shorter than the leaders 12 can be held by engaging the hook end 45 of the leader in the hole 46 and engaging the swivel 48 of the leader against the outward facing surface 33 of the flange 28 with the leader 13 passing through the groove 30 that is aligned with the hole in which the hook 45 is engaged by sliding the intermediate flange 40 to tension the leader. As shown in the drawings, and as noted above, the key 35 carries sale graduations 51 and is preferably raised about ¼' from the surface of the tube 14 and is about ½' wide. The body 14 carries the appropriate scale graduation markings 47 to identify to the fisherman the leader lengths being held so that a desired leader can be quickly identified for use.

Also, if desired, one or more elastic adapters 49 can be provided to further accommodate leaders of different lengths. A preferred adapter 49 is shown in FIG. 6 and includes a pin end 50 receivable in the longitudinal holes 38 and a radially outward extending portion 52 engaged against the axially outward facing surface 53 of the flange 32. An elastic member 54 is attached to the pin member portion 52 and includes a hook receiving ring 56. The elastic member stretches to accommodate and tension leaders of different lengths without requiring repositioning of the flange 32.

Figure 8:
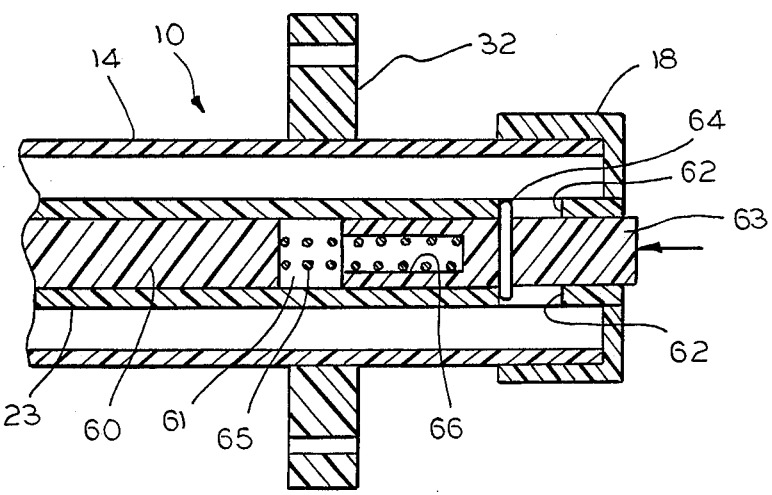
FIG. 8 is an enlarged partial cross sectional view of the holder showing further details of construction of the alternative embodiment in FIG. 7.
Figure 9:
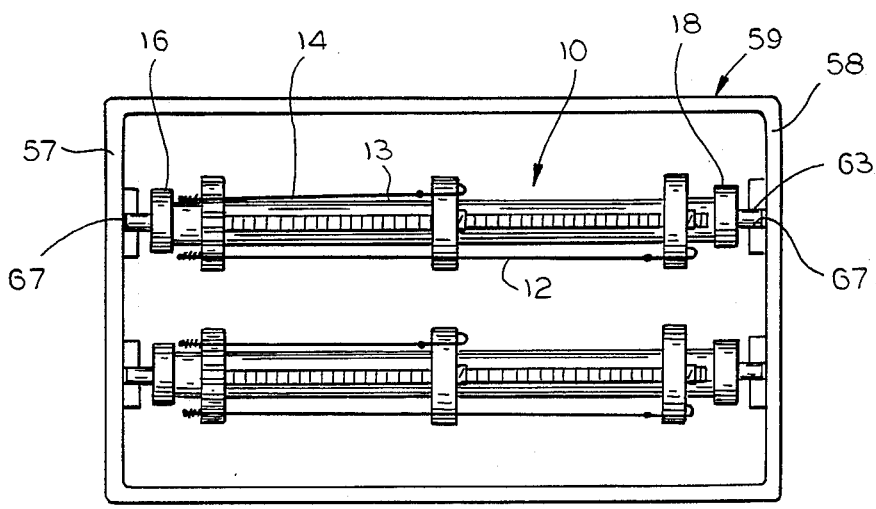
FIG. 9 is a top view of a container showing details of mounting a holder according to the invention in the container.

Referring to FIGS. 7 and 8, there is shown an alternative construction providing for a resilient member at one end of the body 14, for example end 18, to bias the holder between opposing end walls of an external mounting, such as between the opposing walls 57, 58 of a tackle box or other container 59 as shown in FIG. 9. Many axially resilient designs can be devised and the following is representative of only one.

As shown in FIGS. 7 and 8 the internal tube 23 is cut off even with the end caps on the tubular body (only the right end cap 18 being shown in FIGS. 7 and 8) as opposed to extending beyond the ends of the body and a solid rod member or plug 60 having a diameter corresponding to the inside diameter of the internal tube 23 is affixed within the tube 23. The plug 60 extends beyond one end 16 of the body 14, such as end 16 as shown in FIG. 9, to form one extention for engaging one wall 57 of the container. The plug 60 is shorter than the tube 23 and forms a cavity 61 within the tube 23 near the end 18. The tube 23 is provided with at least one elongated aperture 62 in its sidewall and a plunger or push button 63 is slidably disposed in the cavity 61. The push button 63 is retained in the cavity by a transverse pin 64 which extends through the push button and into the aperture 62. A spring 65 is disposed in a cavity 66 in the push button and is supported between the end of the plug 60 and the push button. It can be seen that the push button is movable between the limits of the aperture 62 and is biased against the wall 58 of the container. Preferably, the extension and push button are received in depressions or recepticals, such as 67 in FIG. 7 and 9, provided in the mounting walls 57, 58 of the container to help retain the holder in place. Installation of the holder in the container is easily achieved by engaging the push button 63 against one wall, such as wall 58, in the receptical if provided and moving the holder body 14 to the right, as viewed in FIG. 9, to compress the spring and simultaneously engaging the opposing extension portion of the plug against the other wall 57 of the container in the receptical if provided on that wall. Removal of the holder is accomplished by reversing the procedure.

By way of example only and not as a limitation, a preferred holder would have an overall length for holding leaders of preferably up to 48 inches. A preferred holder would have a body diameter of about 4 inches and annular flange diameters of about 6 inches. Also it is preferred that the flanges would be provided with 16 holes and grooves to accommodate an equal number of leaders. Of course the holder can be made any length and diameter and the flanges can be adapted to mount any number of leaders desired.

Further, although the holder of the invention can be constructed of metal it is contemplated that the preferred material would be plastic, such as PVC plastic, providing for a light weight, inexpensive and floatable holder should it be accidentally dropped into the water by the user.

Having described the preferred embodiment of the invention, those skilled in the art having the benefit of the detailed description and accompanying drawings can readily devise other embodiments and modifications and such other embodiments and modifications are to be considered to be within the scope of the appended claims.

What is claimed is:

1. A fishing leader holder comprising:
    an elongated tube including a graduated scale extending longitudinally along the length of said tube;
    a first annular flange affixed to said tube proximate one end of said tube, said first annular flange including a plurality of spaced apart longitudinal grooves in its peripherial surface;
    a second annular flange slidably mounted to said tube including means for releasably retaining said second annular flange at a plurality of selected positions along said tube spaced from said first annular flange, said second annular flange including a plurality of spaced apart longitudinal holes, each of said plurality of longitudinal holes being generally aligned with respective ones of said plurality of longitudinal grooves.

2. The leader holder as defined in claim 1 including a third annular flange slidably mounted on said tube between said first and second annular flanges including means for releasably retaining said third annular flange at a plurality of selected positions along said tube spaced from said first annular flange, said third annular flange including a plurality of spaced apart longitudinal holes, each of said plurality of longitudinal holes in said third annular flange being generally aligned with respective ones of said grooves in said first annular flange.

3. The leader holder as defined in claim 1 wherein said means for releasably retaining said second annular flange includes a radial set in said second annular flange engagable against said tube.

4. The leader holder as defined in claim 2 wherein said means for releasably retaining said second annular flange and said third annular flange includes a pair of radial set screws, one in said second annular flange engagable against said tube and the second in said third annular flange engagable against said tube.

5. The leader holder as defined in claim 1 further including means for mounting said leader holder in an external mounting including a pair of extensions, one extension extending co-axially from each end of said tube.

6. The leader holder as defined in claim 1 further including means for retaining said leader holder between opposing walls of a container including axially resilient means at one end of said tube.

7. The leader holder as defined in claim 6 wherein said axially resilient means includes a spring biased extension at said one end of said tube.

8. A fishing leader holder comprising:
    an elongated tube;
    a first annular flange fixed on said tube at one end of said tube including a plurality of spaced apart longitudinal peripherial grooves;
    a second annular flange on said tube spaced from said first annular flange including a plurality of spaced apart longitudinal holes generally aligned with respective ones of said plurality of longitudinal peripherial grooves in said first annular flange; and
    a graduated scale on an external surface of said elongated tube extending at least between said first annular flange and said second annular flange.

9. The leader holder as defined in claim 8 including at least one resilient member including means removably engagable in said plurality of longitudinal holes and means for removably attaching a fish hook to said resilient member.

10. The leader holder as defined in claim 9 wherein said means removably engageable in said plurality of holes includes pin means attached to said resilient member and said means for attaching said fish hook includes a ring-like member attached to said resilient member.

11. The leader holder as defined in claim 10 wherein said second annular flange is mounted for slidable movement on said tube and includes means for retaining said second annular flange at selected positions spaced from said first annular flange.

12. A fishing leader holder comprising:
    an elongated tube having a length and opposing ends;
    means at said opposing ends for mounting said tube in an external mounting;
    a first annular flange affixed to said tube proximate one of said opposing ends and including a plurality of spaced apart longitudinal peripherial grooves;
    at least a second annular flange slidably mounted on said tube including means for releasably retaining said second annular flange at selected positions spaced from said first annular flange, said second annular flange further including a plurality of spaced apart longitudinal holes in at least an axially outward faciang surface of said second annular flange aligned with said plurality of longitudinal peripherial grooves in said first annular flange; and
    a graduated scale extending between said first annular flange and said at least second annular flange.

13. The leader holder as defined in claim 12 wherein said means for mounting said tube comprises a pair of extension members, one extension member extending from each of said opposing ends.

14. The leader holder as defined in claim 13 including a mounting member extending co-axially through said tube from said opposing ends.

15. The leader holder as defined in claim 12 wherein said means for mounting said tube comprises an axially resilient member at least one of said opposing ends of said tube.

16. The leader holder as defined in claim 12 including a third annular flange slidably mounted on said tube between said first annular flange and said at least second annular flange said third annular flange including means for releasably retaining said third annular flange at selected positions spaced from said first annular flange, said third annular flange further including a plurality of spaced apart longitudinal holes aligned with respective ones of said longitudinal peripherial grooves in said first annular flange.

17. The leader holder as defined in claim 12 including at least one resilient adapter adapted to be removably received in each of said longitudinal holes in said at least second annular flange and to receive a fish hook end of a fishing leader.

18. The leader holder as defined in claim 17 wherein said resilient adapter includes an elastic member, pin means connected to said elastic member for receipt in said longitudinal holes in said at least second annular flange and a ring member connected to said elastic member.

* * * * *